United States Patent [19]
Yokoyama

[11] 4,205,942
[45] Jun. 3, 1980

[54] HYDRAULIC BALANCING APPARATUS FOR A HYDRAULIC MACHINE

[75] Inventor: Toshiaki Yokoyama, Hitachi, Japan

[73] Assignee: Hitachi, Ltd., Tokyo, Japan

[21] Appl. No.: 899,692

[22] Filed: Apr. 24, 1978

[30] Foreign Application Priority Data

Apr. 22, 1977 [JP] Japan .................................. 52-45647

[51] Int. Cl.² .............................................. F01D 3/00
[52] U.S. Cl. ..................................... 415/106; 415/107
[58] Field of Search ......... 415/104, 106, 500, DIG. 6, 415/107

[56] References Cited

U.S. PATENT DOCUMENTS

| | | | |
|---|---|---|---|
| 865,900 | 9/1907 | Hunsaker | 415/106 |
| 887,658 | 5/1908 | Krogh | 415/106 |
| 971,852 | 10/1910 | Krogh | 415/106 |
| 1,180,602 | 4/1916 | Pfau | 415/106 |

OTHER PUBLICATIONS

Winschal, Helmut, "Reversible Pump/Turbines for Raccoon Mountain"; Paper presented at the International Conference on Pumped Storage Development and Its Environmental Effects, pp. 322-334, (publication date unknown).

*Primary Examiner*—Louis J. Casaregola
*Attorney, Agent, or Firm*—Thomas E. Beall, Jr.

[57] ABSTRACT

A hydraulic balancing apparatus for a hydraulic machine including means communicating an outer runner crown chamber with a runner band chamber. The communicating means has opposed ends opening in the chambers at the substantially identical radial distance which is determined such that the axial thrust applied to a runner by pressure water in sections of the outer runner crown chamber and of the runner band chamber inside of the opposed ends becomes substantially equal to the axial thrust applied to the runner by pressure water in the remaining sections of the chambers outside of the opposed ends.

4 Claims, 7 Drawing Figures

HYDRAULIC BALANCING APPARATUS FOR A HYDRAULIC MACHINE

LIST OF THE PRIOR ART REFERENCES [37 CFR 1.56 (a)]

The following reference is cited to show the state of the art:

"REVERSIBLE PUMP/TURBINE FOR RACOON MOUNTAIN" By Helmut Winschal in "INTERNATIONAL CONFERENCE ON PUMPED STORAGE DEVELOPMENT AND ITS ENVIRONMENTAL EFFECTS", Pages 322–334,

BACKGROUND OF THE INVENTION

This invention relates to hydraulic machines including pumps, turbines and reversible pump turbines each having a runner, a runner crown chamber and a runner band chamber and more particularly to a hydraulic balancing apparatus for regulating the axial thrust applied to the runner of such machines.

Hitherto, in hydraulic machines wherein the runner crown chamber is divided by an intermediate or inner seal into an outer runner crown chamber and an inner runner crown chamber, a hydraulic balancing apparatus is known which has balance pipes communicating the outer runner crown chamber with the runner band chamber by opening at their ends in the two chambers in positions which are at the same radial distance from the axis of rotation of the runner, so that a balance can be established between the axial thrust applied to the outer portion of the runner by pressure water in the outer runner crown chamber and the axial thrust applied thereto by pressure water in the runner band chamber by reducing pressure differential between the two chambers so as to thereby reduce the total axial thrust applied to the runner. This type of hydraulic balancing apparatus is disclosed, for example, in a paper by Helmut Winschal entitled "Reversible Pump/Turbine for Racoon Mountain", particularly in FIG. 16 on page 332, reported in the journal of the "INTERNATIONAL CONFERENCE ON PUMPED STORAGE DEVELOPMENT AND ITS ENVIRONMENTAL EFFECTS", pages 322–334, By using this hydraulic balancing apparatus of the prior art, it is possible to reduce, to a certain degree, the axial thrust applied to the outer portion of the runner. However, since the outer runner crown chamber and the runner band chamber differ from each other in rotational velocity coefficient, the two chambers do not necessarily have the identical radial pressure distribution. This has given rise to the problem of inability of the apparatus to satisfactorily regulate the axial thrust at all times. This problem is important because, in a hydraulic machine of high head and high lift, the outer runner crown chamber and the runner band chamber account for the majority of space of all the pressure chambers and these two chambers have a high hydraulic pressure, with the result that a slight difference in rotational velocity coefficient causes an increase in the value of the axial thrust applied to the runner which increase sometimes may be in the order of several hundred tons.

SUMMARY OF THE INVENTION

This invention has as its object the provision of an improvement in a hydraulic balancing apparatus for a hydraulic machine comprising balance pipe assemblies maintaining the outer runner crown chamber in communication with the runner band chamber. By this improvement, the invention proposes to substantially establish a balance, at all times, between the axial thrust applied to the runner by pressure water in the outer runner crown chamber and the axial thurst applied thereto by pressure water in the runner band chamber irrespective of differences occurring in rotational velocity coefficient between the two chambers, whereby the total axial thrust applied to the runner can be reduced.

According to the present invention, there is provided a hydraulic balancing apparatus for a hydraulic machine including a runner, an outer runner crown chamber, an inner runner crown chamber and a runner band chamber, such apparatus comprising means communicating the outer runner crown chamber with the runner band chamber with opposed ends opening in the respective chambers at the substantially identical radial distance which is determined such that the axial thrust applied to the runner by pressure water in sections of the outer runner crown chamber and of the runner band chamber inside of the opposed ends of the communicating means becomes substantially equal to the axial thrust applied to the runner by pressure water in the remaining sections of the chambers outside of the opposed ends whereby the axial thrust applied to the runner by pressure water in the outer runner crown chamber and in the runner band chamber substantially balance to each other irrespective of occurrence of the difference between rotational velocity coefficients of the chambers.

In one embodiment, the radial distance $r_o$ is determined by the following equation:

$$r_o = k\sqrt{(r_1^2 + r_2^2)/2}$$

where k is 0.9 to 1,1 $r_1$ is the mean radial distance of an inner seal for the outer runner crown chamber and an inner seal for the runner band chamber, and $r_2$ is the mean radial distance of an outer seal for the outer runner crown chamber and an outer seal for the runner band chamber. More preferably, the radial distance may be determined by the following equation:

$$r_o = \sqrt{(r_1^2 + r_2^2)/2}$$

The communication means may include a plurality of balance pipe assemblies each provided with a flow control valve and arranged symmetrically with respect to the rotating axis of the runner.

DESCRIPTION OF THE PREFERRED EMBODIMENTS

Figure 1:
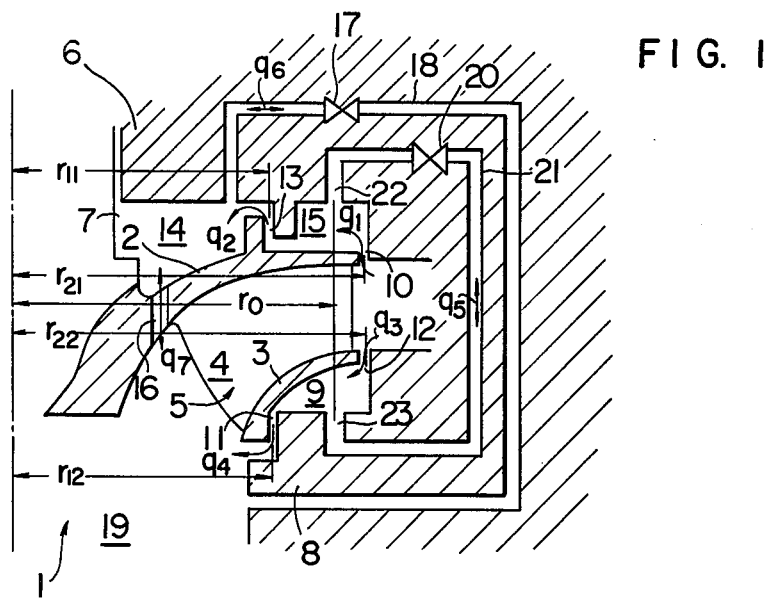
FIG. 1 is a fragmentary sectional view of a hydraulic machine incorporating therein a preferred embodiment of the hydraulic balancing apparatus in conformity with the present invention.

Preferred embodiments of the invention will now be described by referring to the accompanying drawings. In FIG. 1, the numeral 1 generally designates a hydraulic machine having incorporated therein the hydraulic balancing apparatus according to the invention. The hydraulic machine 1 comprises a crown ring 2, a shroud ring 3, and a runner 5 interposed between the two rings 2 and 3 and including a plurality of blades. An upper cover 6 is located above the runner 5 in spaced juxtaposed relation to define therebetween a runner crown chamber 7, while a lower cover 8 is located below the rufnner 5 in spaced juxtaposed relation to define therebetween a runner band chamber 9. An outer seal 10 is provided to the outer periphery of the runner crown chamber 7, while an inner seal 11 and an outer seal 12 are provided to the inner periphery and the outer periphery respectively of the runner band chamber 9, so as to reduce the pressure of pressure water flowing into the chambers to thereby reduce a loss of energy and achieve smooth operation of the machine. The runner crown chamber 7 is further provided with an inner seal 13 to divide the chamber 7 into an inner runner crown chamber 14 and an outer runner crown chamber 15. The inner seal 13 of the runner crown chamber 7 and the inner seal 11 of the runner band chamber 9 are generally at the same radial distance from the axis of rotation of the runner 5. The inner seal 13 is provided for the purpose of dividing the axial thrust applied to the runner 5 into an axial thrust component acting on the inner portion of the runner 5 and an axial thrust component acting on the outer portion of the runner with the seal 13 serving as the boundary, so as to regulate the two axial thrust components individually. The inner runner crown chamber 14 communicates with a flow path in the runner 5 through balance holes 16 and with a draft tube 19 through balance pipes 18 each mounting a flow control valve 17 therein. By this arrangement, regulation of the axial thrust component applied to the inner portion of the runner 5 partitioned by the inner seal 13 from the outer portion thereof can be effected. The outer runner crown chamber 15 is maintained in communication with the runner band chamber 9 through balance pipes 21 each mounting a flow control valve 20 therein. Each of the balance pipes 21 has ends 22 and 23 opening in the outer runner crown chamber 15 and the runner band chamber 9 respectively and located in positions which are substantially at the same radial distance from the center of rotation of the runner 5. By this arrangement, regulation of the axial thrust component applied to the outer portion of the runner 5 partitioned by the inner seal 13 from the inner portion thereof can be effected. The balance pipes 18 and 21 are preferably four in number arranged symmetrically with each other. The balancing means constructed as aforementioned is disclosed in the "Reversible Pump/Turbine for Racoon Mountain" referred to in the background of the invention.

This invention has been developed for the purpose of providing an improvement in the hydraulic balancing apparatus of the type described, so as to enable the axial thrust applied to the outer portion of the runner to be effectively reduced. In order to accomplish the object, the invention contemplates readjustments of the positions of the open ends 22 and 23 of the balance pipes communicating the outer runner crown chamber 15 with the runner band chamber 9.

The axial thrust applied to the outer portion of the runner 5 is the composite of the axially downwardly directed thrust applied by pressure water in the outer runner crown chamber 15 and the axially upwardly directed thrust applied by pressure water in the runner band chamber 9. A difficulty has been encountered in keeping the axially downwardly directed thrust applied by pressure water in the outer runner crown chamber 15 and the axially upwardly directed thrust applied by pressure water in the runner band chamber 9 equal to each other so as to establish a balance between the two thrusts at all times by means of the balance pipes 21 of the aforementioned construction. The reason for the inability of the balance pipes 21 to accomplish the object of establishing a balance between the two oppositely directed thrusts is because the outer runner crown chamber 15 and the runner band chamber 9 do not necessarily have the same radial pressure distribution due to the fact that there is a difference between them in rotational velocity coefficient. The rotational velocity coefficient has a value which is not determined solely by the shape of the outer runner crown chamber 15 or the runner band chamber 9. The value of the rotational velocity coefficient shows variations under the influence of the operating conditions of a hydraulic machine including the starting and stopping of the machine or the flow rates of fluid $q_1$, $q_2$, $q_3$, $q_4$, $q_5$, $q_6$ and $q_7$ flowing into the various chambers, balance pipes and balance holes. It is considered almost impossible to accurately estimate or control the value of rotational velocity coefficient at the present time. After considering the radial pressure distributions in the outer runner crown chamber 15 and the runner band chamber 9 maintained in communication with each other through the balance pipes 21, it has been ascertained that, if the ends 22 and 23 of the balance pipes 21 are made to open in specific positions in the two chambers 15 and 9 respectively, it is then possible to keep the axially downwardly directed thrust applied by pressure water in the outer runner crown chamber 15 and the axially upwardly directed thrust applied by pressure water in the runner band chamber 9 substantially equal to each other at all times, regardless of variations occurring in rotational velocity coefficient.

FIGS. 2A to 2D show typical examples of radial pressure distributions of pressure water in the outer runner crown chamber 15 and the runner band chamber 9 of a hydraulic machine provided with the balance pipes 21, obtained by varying the rotational velocity coefficient of the two chambers and changing the positions of the ends 22 and 23 of the balance pipes 21 opening in the two chambers 15 and 9 respectively. In the graphs showing in these figures, a curve a represents the radial pressure distribution in the outer runner crown chamber 15 and a cruve b represents the radial pressure distribution in the runner band chamber 9. $r_1$ and $r_2$ represent the mean radial distance of the inner seals and the mean radial distance of the outer seals respectively with respect to the axis of rotation of the runner 5. The mean radial distances $r_1$ and $r_2$ can be expressed by the following equations:

$$r_1 = (r_{11} + r_{12})/2$$

$$r_2 = (r_{21} + r_{22})/2$$

where $r_{11}$: the radial distance of inner seal 13 of outer runner crown chamber 15

$r_{12}$: the radial distance of inner seal 11 of runner band chamber 9

$r_{21}$: the radial distance of outer seal 10 of outer runner crown chamber 15

$r_{22}$: the radial distance of outer seal 12 of runner band chamber 9

It is considered that the radial pressure distribution curves a and b can be expressed by the following equation:

$$P = P_o + \frac{\gamma(\alpha\omega)}{2g} r^2 \qquad (1)$$

where $P_o$: the constant $\alpha$: the rotational velocity coefficient of the chambers 15 and 9.

$\omega$: the rotational angular velocity of runner 5.

r: the radial distance.

$\gamma$: the specific gravity of water.

From equation (1) it will be understood that the gradient of the radial pressure distribution curves a and b depends on the rotational velocity coefficient of the chambers 15 and 9. The rotational velocity coefficient is generally in the range between 0.4 and 0.7.

Figure 2A:
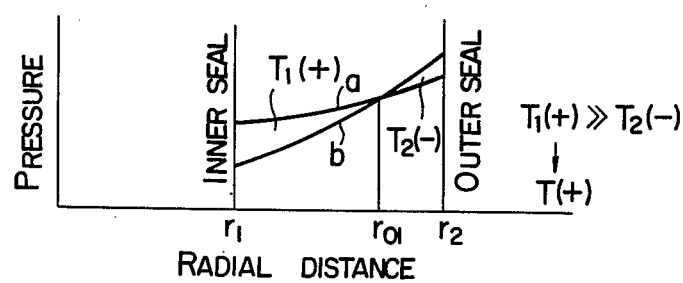
FIGS. 2A to 2D are graphs in explanation of the principle of the hydraulic balancing apparatus according to the invention, showing changes in the radial pressure distributions in the outer runner crown chamber and the runnr band chamber which would be caused by variations in the rotational velocity coefficients of the two chambers and by changes in the positions of the open ends of the balance pipes.
Figure 2B:
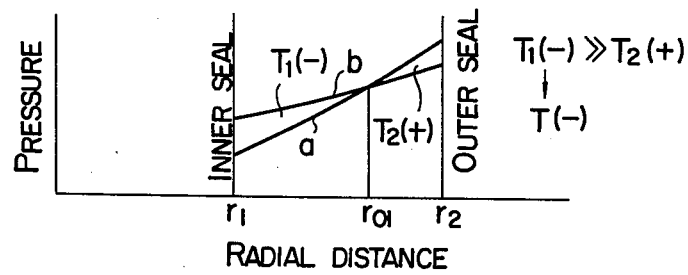
Figure 2C:
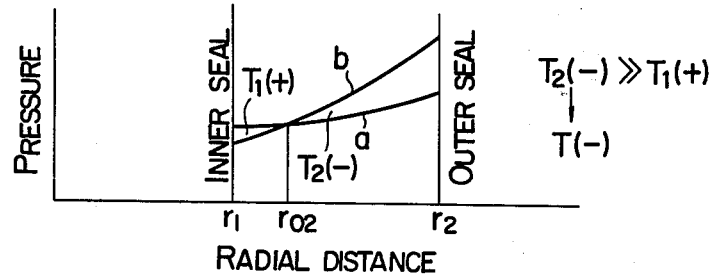
Figure 2D:
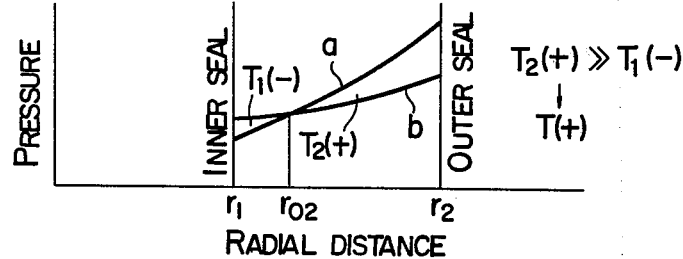

FIG. 2A shows the radial pressure distribution curves a and b obtained when the open ends 22 and 23 of the balance pipes 21 are located in positions near the outer seals 10 and 12 respectively which are at a radial distance $r_{01}$ and the outer runner crown chamber 15 has a lower rotational velocity coefficient than the runner band chamber 9. FIG. 2B shows the curves a and b obtained when the open ends 22 and 23 of the balance pipes 21 are located in the same positions as described with reference to FIG. 2A and the outer runner crown chamber 15 has a higher rotational velocity coefficient than the runner band chamber 9. FIG. 2C shows the curves a and b obtained when the open ends 22 and 23 of the balance pipes 21 are located in positions near the inner seals 13 and 11 respectively which are at a radial distance $r_{02}$ and the outer runner crown chamber 15 has a lower rotational velocity coefficient than the runner band chamber 9. FIG. 2D shows the curves a and b obtained when the open ends 22 and 23 of the balance pipes 21 are located in the same positions as described with reference to FIG. 2C and the outer runner crown chamber 15 has a higher rotational velocity coefficient than the runner band chamber 9. In FIGS. 2A to 2D, the total axial thrust T can be obtained based on the pressure differential between the radial pressure distribution curves a and b. That is, the total axial pressure T acting on the outer portion of the runner 5 can be expressed as the composite of an axial thrust $T_1$ applied by pressure water in the regions each lying between the point at the mean radial distance $r_1$ of the inner seals 13 and 11 and the point at each one of the two radial distances $r_{01}$ and $r_{02}$ for the open ends 22 and 23 and an axial thrust $T_2$ applied by pressure water in the regions each lying between the point at each one of the two radial distances $r_{01}$ and $r_{02}$ for the open ends 22 and 23 and the point at the mean radial distance $r_2$ of the outer seals 10 and 12. It will be seen that in FIG. 2A the axial thrust $T_1$ is downwardly directed and the axial thrust $T_2$ is upwardly directed with $T_1 > T_2$ so that the total axial thrust $T = T_1 - T_2$ acts downwardly on the outer portion of the runner 5, in FIG. 2B the axial thrust $T_1$ is upwardly directed and the axial thrust $T_2$ is downwardly directed with $T_1 > T_2$ so that the total axial thrust $T = T_1 - T_2$ acts upwardly thereon, in FIG. 2C the axial thrust $T_1$ is downwardly directed and the axial thrust $T_2$ is upwardly directed with $T_1 < T_2$ so that the total axial thrust $T = T_2 - T_1$ acts upwardly thereon, and in FIG. 2D the axial thrust $T_1$ is upwardly directed and the axial thrust $T_2$ is downwardly directed with $T_1 < T_2$ so that the total axial thrust $T = T_2 - T_1$ acts downwardly thereon. In these figures, the axially downwardly directed thrust is designated by a symbol (+) and the axially upwardly directed thrust is designated by a symbol (−).

Figure 3:
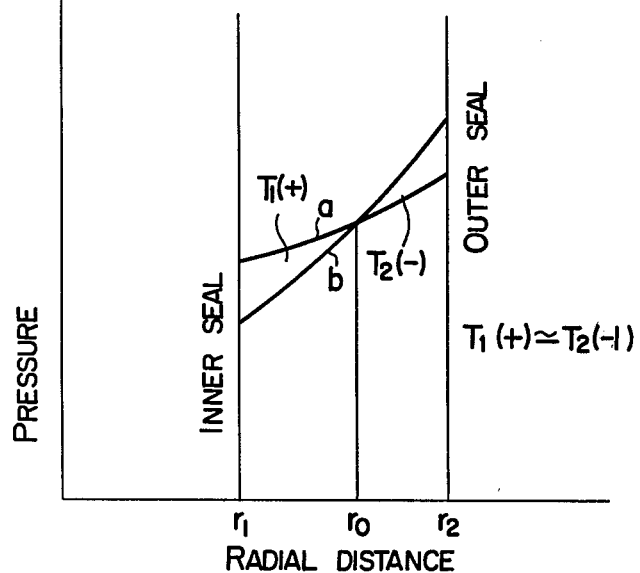
FIG. 3 is a graph similar to the graphs shown in FIGS. 2A to 2D but showing the radial pressure distributions in the outer runner crown chamber and the runner band chamber obtained when the hydraulic balancing apparatus according to the invention is used.

From the discussion set forth hereinabove, it can be seen that there are specific positions for the open ends 22 and 23 of the balance pipes 21 in which the axial thrust $T_1$ applied by pressure water in sections of the chambers 15 and 9 inwardly of the open ends 22 and 23 of the balance pipes 21 is equal to the axial thrust $T_2$ applied by pressure water in sections of the chambers 15 and 9 disposed outwardly of the open ends 22 and 23 of the balance pipes 21, with the result that the total axial thrust T becomes substantially zero when the open ends 22 and 23 are disposed in these positions. FIG. 3 is a graph similar to the graphs shown in FIGS. 2A to 2D but showing the curves a and b obtained when the open ends 22 and 23 of the balance pipes 21 are located in the aforesaid specific positions. In FIG. 3, the axial thrust $T_1$ applied by pressure water in the region lying between the point of the mean radial distance $r_1$ of the inner seals and the point at the radial distance $r_o$ and the axial thrust $T_2$ applied by pressure water in the region between the point at the mean radial distance $r_2$ of the outer seals and the point at the radial distance $r_o$ have been obtained by integral calculation from equation (1) by assuming that the radial pressure distribution curves a and b of the outer runner crown chamber 15 and the runner band chamber 9 respectively are secondary curves proportional to the square of the radial distance r expressed by equation (1). The values of the axial thrusts $T_1$ and $T_2$ obtained in this way have been equalized to obtain the following equation:

$$r_0 = \sqrt{(r_1^2 + r_2^2)/2} \qquad (2)$$

Attention is directed to the fact that $r_o$ is a value expressed by using the values of $r_1$ and $r_2$ which can be obtained based on the structure of a hydraulic machine. That is, it has been ascertained that if the open ends 22 and 23 of the balance pipes 21 are located in positions which are at the radial distance $r_o$ from the axis of rotation of the runner 5, then the axial thrusts $T_1$ and $T_2$ become equal in value and that consequently the downwardly directed axial thrust applied by pressure water in the outer runner crown chamber 15 and the upwardly directed axial thrust applied by pressure water in the runner band chamber 9 substantially balance, with this balance being established even if there is a difference in rotational velocity coefficient between the outer runner crown chamber 15 and the runner band chamber 9.

The end openings 22 and 23 of the balance pipes 21 shown in FIG. 1 are located in positions which are determined by the radial distance $r_o$ obtained by using equation (2). From the discussion set forth hereinabove, it will be understood that, by positioning the open ends 22 and 23 of the balance pipes 21 in this way, it is possible to establish a balance between the axial thrusts applied by the outer runner crown chamber 15 and the runner band chamber 9 at all times, irrespective of variations occurring in rotational velocity coefficient between the two chambers 15 and 9, so that the total axial thrust applied to the runner 5 can be greatly reduced.

In the discussion set forth hereinabove, the radial pressure distribution curves a and b have been assumed to be secondary curves which are proportional to the square of the radial distance r expressed by equation (1). In actual practice, however, they are not considered to be in the form of perfect secondary curves. Also, even if the positions of the open ends 22 and 23 were slightly displaced from the positions defined by equation (2) because the open ends have a diameter of a certain value, say 20 cm, it would be considered that the aforementioned effect of balancing upwardly and downwardly directed axial thrusts can be substantially achieved. Therefore, the following equation (3) obtained by introducing an allowance coefficient K into equation (2) is considered to be within the scope of the present invention.

$$r_o = K\sqrt{(r_1^2 + r_2^2)/2} \qquad (3)$$

It has been ascertained as the results of experiments that when the allowance coefficient $K=0.9-1.1$ is used in equation (3), balance pipes having their open ends positioned at the radial distance $r_o$ obtained by equation (3) enable the axial thrust applied to the outer portion of the runner to lie substantially in the allowable range.

Figure 4:
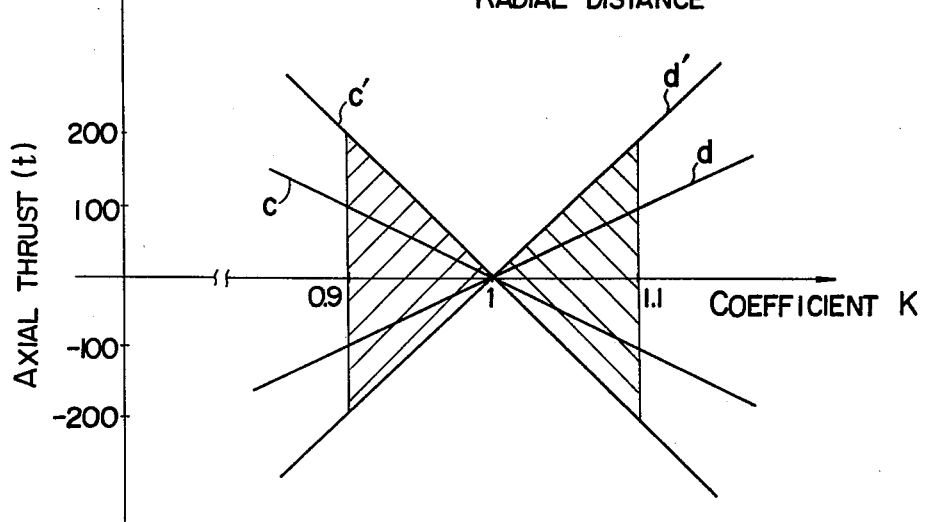
FIG. 4 is a graph showing the allowable range of variations in the positions of the open ends of the balance pipes of the hydraulic balancing apparatus according to the invention.

FIG. 4 shows the results of experiments conducted on hydraulic turbines capable of developing a power output of the order of 300 Mw with a head of 500 m, in which the axial thrusts applied to the runner were measured by incorporating in the turbines balance pipes 21 having open ends located in various positions by using different values for the allowance coefficient K. The axial thrusts measured have been found to lie substantially in the regions defined by lines c and d at the time of steady operation and to lie substantially in the regions defined by lines c' and d' at the time of transitory operation. From FIG. 4 it will be seen that, if K is in the range between 0.9 and 1.1, the axial thrusts are in the range substantially between 100 and −100 tons at the time of steady operation and are in the range substantially between 200 and −200 tons at the time of transitory operation. The axial thrusts in the range between 200 and −200 tons are in the allowable range for hydraulic turbines of the class described when their endurance limits are taken into consideration.

From the foregoing description, it will be appreciated that in the hydraulic balancing apparatus according to the invention, the open ends of the balance pipes 21 are positioned at the radial distance $r_o$ from the axis of rotation of the runner as obtained by equation (2) or (3), and that this structural feature permits a balance to be established at all times between the axial thrusts applied to the outer portion of the runner 5 irrespective of changes occurring in the rotational velocity coefficient of the outer runner crown chamber 15 and the runner band chamber 9. Particularly, when the hydraulic balancing apparatus is combined with the balance pipes 18 and balance holes 16 for regulating the axial thrusts applied to the inner portion of the runner 5, it is possible to greatly reduce the total axial thrust applied to the runner 5.

What is claimed is:

1. In a hydraulic machine including a runner, a runner crown chamber and a runner band chamber, said runner crown chamber being divided by an inner seal into an inner runner crown chamber and an outer runner crown chamber, said outer runner crown chamber being provided with an outer seal along an outer circumference thereof, said runner band chamber being provided with another inner seal along an inner circumference thereof and another outer seal along an outer circumference thereof, a hydraulic balancing apparatus comprising means communicating said outer runner crown chamber with said runner band chamber with opposed ends opening in said chambers at the substantially identical radial distance which is determined such that the axial thrust applied to said runner by pressure water in sections of said outer runner crown chamber and of said runner band chamber inside of said opposed ends of said communicating means becomes substantially equal to the axial thrust applied to said runner by pressure water in the remaining sections of said chambers outside of said opposed ends of said communicating means whereby the axial thrusts applied to said runner by pressure water in said outer runner crown chamber and in said runner band chamber substantially balance to each other irrespective of occurrence of the difference between rotational valocity coefficients of said chambers, and said radial distance $r_o$ being further determined by the following equation:

$$r_o = K\sqrt{(r_1^2 + r_2^2)/2}$$

wherein K: 0.9 to 1.1,
$r_1$: the mean radial distance of the inner seals,
$r_2$: the mean radial distance of the outer seals.

2. The hydraulic balancing apparatus as defined in claim 1, wherein said communicating means includes a plurality of balance pipe assemblies each provided with a flow control vlve and arranged symmetrically with respect to the rotating axis of said runner.

3. In a hydraulic machine including a runner, a runner crown chamber and a runner band chamber, said runner crown chamber being divided by an inner seal into an inner runner crown chamber and an outer runner crown chamber, said outer runner crown chamber being provided with an outer seal along an outer circumference thereof, said runner band chamber being provided with another inner seal along an inner circumference thereof and another outer seal along an outer circumference thereof, a hydraulic balancing apparatus comprising means communicating said outer runner crown chamber with said runner band chamber with opposed ends opening in said chambers at the substantially identical radial distance which is determined such that the axial thrust applied to said runner by pressure water in sections of said outer runner crown chamber and of said runner band chamber inside of said opposed ends of said communicating means becomes substantially equal to the axial thrust applied to said runner by pressure water in the remaining sections of said chambers outside of said opposed ends of said communicating means whereby the axial thrusts applied to said runner by pressure water in said outer runner crown chamber and in said runner band chamber substantially balance to each other irrespective of occurrence of the difference between rotational velocity coefficients of said chambers, and said radial distance $r_o$ being further determined by the following equation:

$$r_o = \sqrt{(r_1^2 + r_2^2)/2}$$

where $r_1$: the mean radial distance of the inner seals, $r_2$: the mean radial distance of the outer seals.

4. The hydraulic balancing apparatus as defined in claim 3, wherein said communicating means includes a plurality of balance pipe assemblies each provided with a float control valve and arranged symmetrically with respect to the rotating axis of said runner.

* * * * *